(12) United States Patent
Menzel et al.

(10) Patent No.: US 6,504,835 B1
(45) Date of Patent: Jan. 7, 2003

(54) METHOD AND SYSTEM FOR CONFIGURING A RADIO INTERFACE IN A COMMUNICATION SYSTEM

(75) Inventors: Christian Menzel, Maisach (DE); Martin Öttl, Weilheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/308,477

(22) PCT Filed: Nov. 6, 1997

(86) PCT No.: PCT/DE97/02581

§ 371 (c)(1),
(2), (4) Date: May 17, 1999

(87) PCT Pub. No.: WO98/23104

PCT Pub. Date: May 28, 1998

(30) Foreign Application Priority Data

Nov. 18, 1996 (DE) .......................................... 196 47 629
Dec. 16, 1996 (DE) .......................................... 196 52 303

(51) Int. Cl.[7] ............................ H04J 3/00; H04B 7/212; H04B 7/00; H04L 12/43; H04L 12/66
(52) U.S. Cl. ....................... 370/345; 370/337; 370/347; 370/442; 370/458; 370/463; 455/517
(58) Field of Search .......................... 455/517; 370/337, 370/347, 338, 352, 442, 458, 463

(56) References Cited

FOREIGN PATENT DOCUMENTS

| DE | 44 02 903 A1 | 8/1995 | |
|---|---|---|---|
| EP | 0 681 406 A1 | 8/1995 | |
| EP | 0 681 406 A | * 11/1995 | ............ H04Q/7/24 |

OTHER PUBLICATIONS

A Packet Radio Protocol for Group Communication Suitable for the GSM Mobile Radio Network, Decker, pp. 934–938.

* cited by examiner

Primary Examiner—Edward F. Urban
Assistant Examiner—Meless Zewdu
(74) Attorney, Agent, or Firm—Bell, Boyd & Lloyd LLC

(57) ABSTRACT

A method and system for configuring a radio interface between a mobile station and a base station of a time-division multiplex mobile radio telephone system for a packet data transmission, wherein, the mobile stations are additionally identified with brief identifiers and time slots for signaling for the upstream direction are allocated to the mobile stations. The allocation of one or more time slots for signaling for the upstream direction occurs according to a prescribable sequence, wherein the allocation occurs with indicator messages that contain abbreviated identifiers and time slot designations. The allocation is thus independent of a sequence of the packets data transmission from or to the mobile station.

10 Claims, 4 Drawing Sheets

GPRS-K

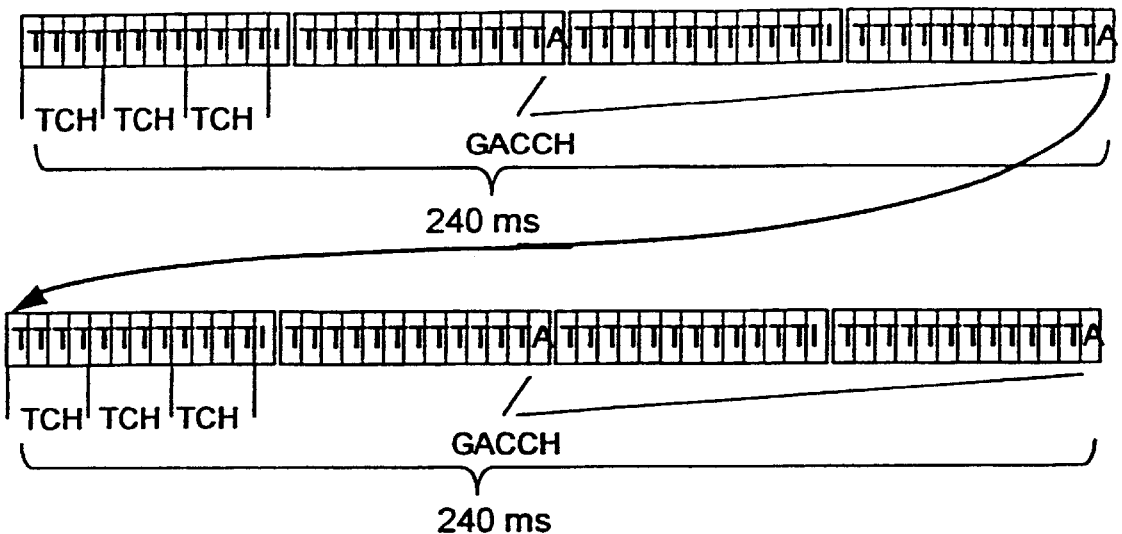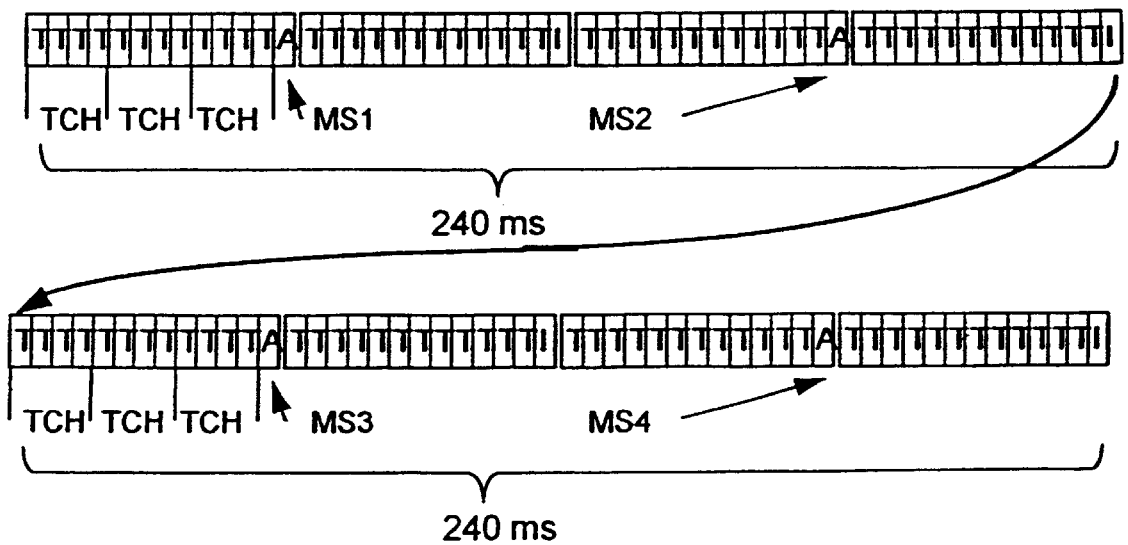

Fig. 4

Table 1

| GACCH-Burst | Uplink direction<br>Measurements relating to the adjacent cells | Downlink direction<br>GACCH-Block |
|---|---|---|
| A0 | MS1, id 0 Uplink | TA and PC for MS1 to 4 |
| A1 | MS2, id 1 Uplink | TA and PC for MS1 to 4 |
| A2 | MS3, id 2 Downlink | TA and PC for MS1 to 4 |
| A3 | MS4, id 3 Downlink | TA and PC for MS1 to 4 |

Table 2

| GACCH-Burst | Uplink direction | Downlink direction<br>GACCH-Block |
|---|---|---|
| A0 | MS1, id 0 Both directions | TA for MS1 to 4 |
| A1 | MS2, id 1 Both directions | TA for MS1 to 4 |
| A2 | MS3, id 2 Both directions | TA for MS1 to 4 |
| A3 | MS4, id 3 Both directions | TA for Ms1 to 4 |

Table 3

| GACCH-Burst | Uplink direction | Downlink direction<br>GACCH-Block |
|---|---|---|
| A0 | MS1, id 0 Both directions | TA for MS1 |
| A1 | MS2, id 1 Both directions | TA for MS2 |
| A2 | MS3, id 2 Both directions | TA for MS3 |
| A3 | MS4, id 3 Both directions | TA for MS4 |

METHOD AND SYSTEM FOR CONFIGURING A RADIO INTERFACE IN A COMMUNICATION SYSTEM

BACKGROUND OF THE INVENTION

1. Field of the Invention

The present invention relates to a method and base station system for configuring a radio interface between a mobile station and a base station of a time-division multiplex mobile radio telephone system for a packet data transmission data transmission.

2. Description of the Prior Art

Connection-oriented concepts and concepts on the basis of logical connections can be recoursed for the transmission of data between two pieces of communication terminal equipment. Given connection-oriented data transmissions, physical resources between the two pieces of communication terminal equipment must be offered during the entire time of the data transmission.

A permanent offering of physical resources is not necessary given data transmission via logical connections. An example of such a data transmission is packet-data transmission. Here, a logical connection between the two pieces of communication terminal equipment exists during the duration of the entire data transmission. However, physical resources are offered only during the actual transmission times of the data packets. This method is based on the fact that the data are communicated in short data packets between which longer pauses can occur. The physical resources are available for other logical connections in the pauses between the data packets. Physical resources are saved with reference to a logical connection.

The packet data transmission method disclosed by German Letters Patent DE 44 02 930 A1 is particularly suitable for communication systems having physical limited resources. The physical resources in the frequency domain—the number of frequency channels and time slots—are limited and must be rationally utilized in, for example, mobile radio telephone systems such as the GSM mobile radio telephone system (global system for mobile communications).

The GSM mobile radio telephone system is an example of a time-division multiplex mobile radio telephone system, whereby time slots within a frequency channel can be divided onto different communication terminal equipment. The network-side radio station of a mobile radio telephone network is a base station that communicates with mobile stations via a radio interface. The transmission from a mobile station to the base station is referred to as upstream direction; the transmission from the base station to a mobile station is referred as downstream direction. A channel that is reserved for the packet-data transmission is formed by at least one time slot per time-division multiplex frame. Further, the carrier frequency and, potentially, a frequency skip sequence identify the channel.

The GSM mobile radio telephone system was originally designed for the transmission of voice, whereby a channel was reserved for the constant information transmission between mobile station and base station. In packet data transmission, however, a common channel is used for packet-data transmission for a plurality of mobile stations. Signaling information, for which a time slot is provided within the channel at cyclical intervals, is transmitted in addition to the packet data.

What the distinction in the logical and physical connections yields is that a logical connection in fact exists for a mobile station but no packet data is transmitted over a certain time span. Measurements of the base station with respect to the transmission conditions of the mobile station, however, are not possible as long as no transmission is occurring from the mobile station to the base station. Previously calculated values become invalid and must be re-identified given a renewed allocation of physical channels or, respectively, the base station must assure that the transmission conditions are set such that a protected transmission is possible in any case. This latter situation, for example, leads to an elevated or even maximum transmission power setting.

The present invention, therefore, is based on the object of specifying a method and a system with improved configuration of an air interface for packet data transmission.

SUMMARY OF THE INVENTION

Pursuant to the present invention, the mobile stations are identified with abbreviated identifiers. In the method for configuring the radio interface, time slots for signaling for the upstream direction are allocated to the mobile stations. The allocation of one or more time slots for signaling for the upstream direction occurs according to a prescribable sequence, wherein the allocation occurs with indicator messages that contain abbreviated identifiers and time slot designations. The allocation is thus independent of a sequence of the packet data transmission from or to the mobile station.

As a result of a flexible allocation of a time slot for signaling even, a for mobile stations to which no physical channel is allocated at the moment, the base station can implement a continuous measurement to the radio interface. Given re-assumption of the packet data transmission, valid measured values are thus immediately available for configuring the radio interface.

According to a further advantageous development, the abbreviated identifiers of the mobile stations are selected in addition to their identifications within the mobile radio telephone system for the packet data transmission. The abbreviated identifiers enable an improved resource utilization between the network and the mobile stations via the radio interface to since they are independent of addresses for the mobile stations known in the network, and the signaling is flexibly designed according to individual requirements independently of the packet data transmission.

In a further development of the method for configuring the radio interface, configuration data with respect to the radio interface for a plurality of mobile stations are combined and transmitted in a time slot for signaling. Such a signaling is of significance for the downstream direction since information for configuring the radio interface for the mobile station, for example the values related to the transmission power setting or, respectively, the timing advance for the transmission time, is contained in it. Since only a few particulars are required per mobile station, a combining of the configuration data in one message saves transmission capacity that is now available for neighboring cell measurements or for some other kind of signaling information.

The configuration data for a mobile station can be transmitted together with the configuration data for other mobile stations in a single time slot for signaling in a downstream direction, advantageously repeated or provided with a coating or error recognition in this case, or in a plurality of non-successive time slots for signaling. In the latter instance, the nesting provides protection against error. Which time slots are combined to form such a signaling block can be set.

Given such a utilization of, for example, a second time slot for signaling, the intervening time slots can be utilized for neighboring cell measurements.

The portion of time slots for the neighboring cell measurements can be increased further when less configuration data (for example, only the timing advance) is transmitted or, respectively, when only few mobile stations are to be covered. A cyclical adaptation of the sequence of the combining thereby can be provided. Such an adaptation creates an improved matching of the signaling outlay to the actual requirements of the mobile stations for a packet data transmission. The closed control circuit for the timing advance can be achieved according to the present invention, since mobile stations have time slots allocated to them for signaling in the upstream direction and signaling blocks for the mobile stations arrive in downstream direction with a short delay time. Only the mobile station and the base station advantageously participate in this control circuit. Since, differing from packet data transmission, no concrete allocation between a mobile station and a data block (which is usually implemented in a base station controller) is needed for this signaling, the base station can undertake the setting of the timing advance by itself. Signaling outlay between the base station and the base station controller is thereby eliminated.

According to a further development of the present invention, the configuration for the timing advance occurs independent of the transmission power setting. The timing advance is defined according to a closed control circuit between mobile station and base station, wherein a longer cycle can be provided between two determinations on the basis of a suitable selection of the time slots for signaling. The timing advance has to be identified only at a spacing of a few seconds in view of the slow movement of the mobile station relative to the signal propagation speed.

In the determination of the transmission power setting of the base station, the transmission power is advantageously directed onto the mobile station with the poorest transmission correction on the common channel. Open or closed control circuits can be established for this purpose independently of a determination of the timing advance. Given great differences between the transmission power required for individual mobile stations and given a presence of a plurality of common channels, it is advantageous to allocate the mobile stations to the channels according to the required transmission power.

Advantageously, the packet data transmission in each transmission direction, i.e. in upstream direction and downstream direction, occurs independently of one another. Consequently, a mobile station can transmit data in upstream direction or receive data from the network in downstream direction. A packet data transmission in both directions also can be provided for a mobile station. The separation into upstream and downstream direction enables a great flexibility in the utilization of the radio-oriented resources and, of course, in the design of the mobile station as well, which potentially only transmits or receives.

Advantageously, a closed message is communicated to the base station from a mobile station within a time slot for signaling. This closed message contains, for example, reception values of the mobile station for signals of the base station, as a result whereof an immediate transmission power setting of the base station is possible given a packet data transmission in downstream direction. In that one closed message is communication per time slot, the time until the reception level of the mobile station is present at the base station and the time for the configuration of the radio interface are shortened. The base station determines the timing advance or, respectively, the reception level of the base stations with reference to the respective mobile station from transmissions for signaling in upstream direction.

The specific value or values or, respectively, control values for the timing advance and the transmission power are communicated to the mobile station in downstream direction, whereupon this also can undertake the necessary settings for configuration of the radio interface.

The configuring is accelerated further when the determination of the timing advance and/or of the reception level of the base station is additionally undertaken from the time slots for the packet data transmission. The allocation of abbreviated identifiers to mobile stations can also influence the setting time of the configuration. The setting time is shortened, for example, when a plurality of abbreviated identifiers are allocated to a mobile station. It is likewise possible to keep the delay times short on the basis of a corresponding selection of specific abbreviated identifiers at the end of a macro frame. The limitation of the number of abbreviated identifiers leads to a faster re-employment of a time slot for signaling for a mobile station and to a shortening of the delay time. The plurality of abbreviated identifiers is advantageously set according to the transmission conditions and the number of mobile stations provided for the packet data service.

When a plurality of time slots for signaling are combined in downstream direction to form a signaling block, then the signaling advantageously occurs simultaneously for a plurality of mobile stations. The signaling in downstream direction, however, can likewise occur within packet data so that, for example, the transmission power setting can be continuously adapted without utilizing time slots for signaling and additional time slots are available for neighboring cell measurement.

The signaling outlay also can be lowered by the selection of specific transmission block types. When normal transmission blocks (normal bursts) are employed by contrast to what are referred to as access bursts, an identification of reception power is possible by averaging over a greater plurality of bits, as a result whereof the measuring precision is increased or, respectively, a lower number of repeated measure values is required for setting the transmission power. Such longer transmission blocks are advantageously employed for setting the transmission power when valid values for the timing advance are already present.

Additional features and advantages of the present invention are described in, and will be apparent from, the Detailed Description of the Preferred Embodiments and the Drawing.

DESCRIPTION OF THE DRAWING

FIG. 3 shows the time slots of a channel for a packet data transmission; and

FIG. 4 shows the utilization of time slots for signaling (Tables 1, 2 and 3).

DETAILED DESCRIPTION OF THE PREFERRED EMBODIMENTS

Figure 1:
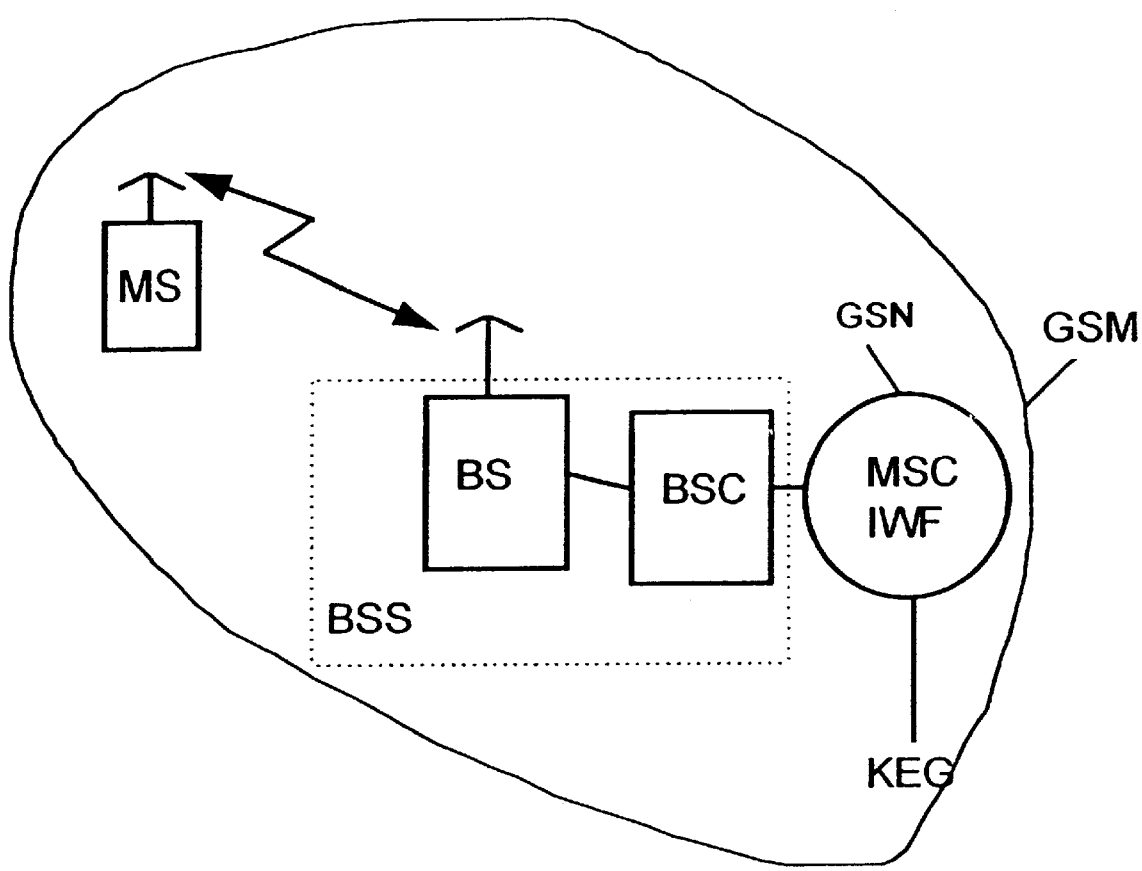
FIG. 1 shows a block circuit diagram of a time-division multiplex mobile radio telephone system for packet data transmission.

The time-division multiplex mobile radio telephone system according to FIG. 1 is, for example, a GSM mobile radio telephone network GSM that contains at least one base station system BSS with a control means BSC and a base station BS. Mobile stations MS are located in the radio coverage area of the one illustrated base station BS. The base station system BSS produces the connection to further devices of the GSM mobile radio telephone network GSM.

These further devices are, for example, a mobile switching center MSC and a unit for realizing inter-working functions IWF. The collaboration of mobile switching center MSC and inter-working functions IWF yields a packet switching center that is also referred to as GSN (GPRS support node). This packet switching center is connected to an MSC for voice communication; alternatively, it could be realized as a separate, offset unit.

The GSM mobile radio telephone network GSM can be connected to further communication networks. For example, a further communication terminal equipment KEG is connectable to the GSM mobile radio telephone network or is itself a component part of this GSM mobile radio telephone network GSM.

The GSM mobile radio telephone network GSM should be utilized for packet data transmission in parallel with known voice transmission. The means for realizing inter-working functions IWF can thereby produce the coupling of the GSM mobile radio telephone network GSM with data transmission networks and, thus, with the further communication terminal equipment KEG.

Figure 2:
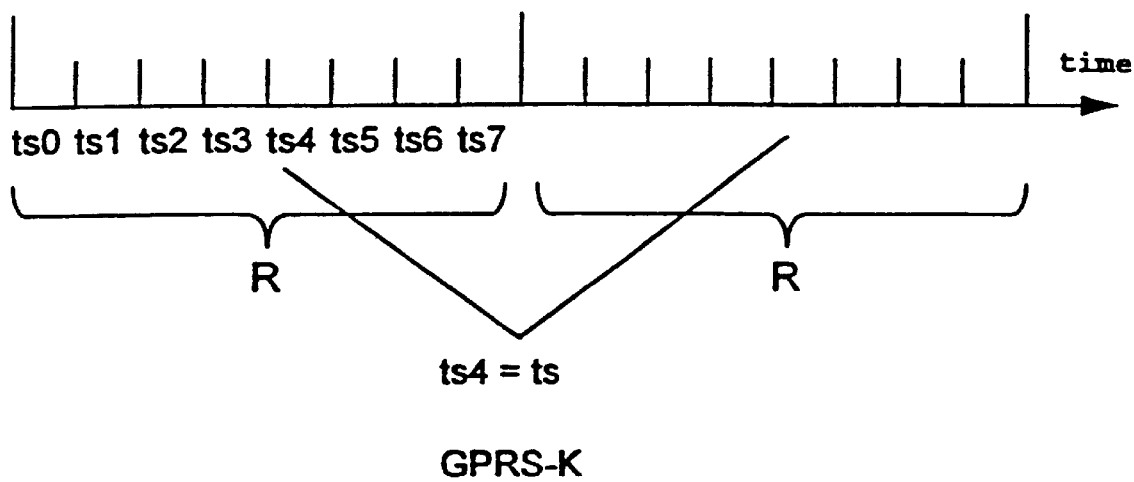
FIG. 2 shows a frequency channel with time-division multiplex.

The radio interface between the mobile stations MS and a base station BS is characterized by a frequency and at least one time slot ts. According to FIG. 2, for example, eight time slots ts (ts0 through ts7) are combined to a frame R. The frame R repeats cyclically, whereby a recurring time slot, for example the time slot ts=ts4, belongs to a channel. This time slot ts is subsequently employed as channel GPRS-K for the packet data transmission for the purpose of the service GPRS (general packet radio services).

When a mobile station MS is to use this service, then it implements a random access according to the GSM terminology with a short, so-called access burst and switches to a dedicated control channel. An authentification at the setting of the context with respect to a logical connection (standby state) follow. When the further communication terminal equipment KEG is to communicate with a mobile station MS via the packet data service, a call (paging) as well as the described random access occur at the network side.

When the mobile station MS is to transmit or receive data packets (ready state), a further random access occurs given the existence of a logical connection. An abbreviated identifier id and the corresponding GPRS channel GPRS-K is thereby allocated to the mobile station MS. Whereupon the timing advance ta and the reception level pb in the base station BS are identified at the network side, the mobile station MS is assigned four successive time slots T as a packet data block TCH in upstream direction. Potentially, a particular regarding the transmission power control is additionally transmitted.

The packet data transmission and the appertaining signaling shall now be shown with reference to FIG. 3 and to Tables 1 through 3.

Respectively, four time slots T for packet data transmission are combined to form a packet data block TCH. Three such packet data blocks TCH and a time slot A, I for signaling repeat four times to form a macro frame that covers 52 frames R. This is true both of the upstream as well as of the downstream direction. Further, two such macro frames in turn form a frame of a higher order. A macro frame lasts 240 ms.

The information of a packet data block TCH with four time slots T are interleaved. The allocation of packet data blocks TCH to different mobile stations MS ensues in upstream and downstream direction flexibly on to one or more mobile station MS. Different data rates can thus be realized. One can distinguish between the mobile stations MS via the access to the GPRS channel on the basis of prioritizations. Upstream direction and downstream direction shall be considered separately below, whereby a mobile station MS can definitely communicate in both directions. The allocation of packet data blocks TCH during the existence of a logical connection occurs in the band, i.e. who can use the following packet data blocks TCH is indicated to the mobile stations MS by indicator messages within the packet data blocks TCH.

Not only are four successive time slots T for packet data transmission interleaved in the downstream direction, but an interleaving of the signaling information that form a signaling block GACCH also occurs. According to FIG. 3, every second time slot A for signaling is combined to form the signaling block GACCH, during which time intervening time slots I are employed for measurements of the mobile stations MS in neighboring cells. The sequence of time slots A, I for signaling and neighboring channel measurement also can follow a different sequence; for example, $A/I=\frac{1}{3}$. A switching of the sequences is undertaken by the base station BS according to the transmission conditions.

The neighboring cell measurements serve for determining base stations BS that can be selected given a deterioration of the transmission conditions on the momentarily allocated channel. A priority list is present in the mobile station on the basis of these measurements.

A signaling block GACCH thereby contains information for several mobile stations MS, see Table 1 and Table 2 with respect thereto. Alternatively, measured to Table 3, it is possible to reduce the plurality of time slots per signaling block GACCH and, in addition to or as an alternative to an interleaving, to multiply transmit the configuration data (timing advance TA and/or transmission power setting PC) in a time slot or, respectively, to provide it with a further protection; for example, with an encoding.

The inventive method is particularly advantageous when only a determination of timing advance is undertaken and is signaled as described below. The determination of transmission power occurs independently thereof. The higher flexibility in the configuring of the radio interface arises on the basis of such a separation of the determination of the two configuration data TA, PC. For simplification, however, an identical control circuit in the determination of timing advance TA and transmission power setting PC shall be assumed below.

For example, the GACCH block contains the values for the timing advance TA and the transmission power setting PC (for example, the reception level of the base station BS or the required transmission power) for the mobile stations 1 through 4. In this case, the duration until the repetition of the timing advance TA and of the transmission power values PC amounts to 480 ms. When a signaling occurs only for two mobile stations, for example two mobile stations that transmit in upstream direction, the number of abbreviated identifier id can be reduced to two and the delay time now amounts to 240 ms.

The allocation of the time slots A for signaling in upstream direction occurs as follows. According to Table 1, the allocation of the time slots A0 through A1 for the mobile stations 1 through 2 occurs in the upstream direction (abbreviated identifiers id 0 through 1) and the allocation of the time slots A2 through A3 for the mobile stations MS 2 through MS 3 occurs in the downstream direction (abbreviated identifiers id 2 through 3). When the mobile stations MS communicate both in the upstream and in the downstream directions, then the allocation of the time slots A for signaling occurs according to Table 2.

Given the allocation according to Table 1, i.e. the separate consideration of upstream direction and downstream direction, each mobile station MS transmits a specifically encoded access burst to the base station BS in the time slot A for signaling that is allocated to it. The field strength and quality (RXLEV, RXQUAL) with which the signaling blocks GACCH of the base station BS were received in the downstream direction are signaled therein. The base station BS measures the transmissions (allocated time slots A for signaling) of the mobile stations MS in order to determine a timing advance TA and a transmission power or, respectively, the transmission power change PC of the mobile station and to signal it to it. The mobile station MS thus receives values that it uses when packet data blocks TCH are transmitted in the upstream direction.

The base station BS uses the reception levels pm reported from the mobile station MS to set an appropriate transmission power when packet data blocks TCH for the data transmission are subsequently transmitted in the downstream direction to the mobile station MS. The following delay times derive for the current nature of the timing advances TA and transmission power values in the upstream direction: the mobile station MS receives new values at the spacing of 480 ms. Care is exercised in the sequence of the time slots I, A to see that the time between signaling in the upstream direction by a mobile station MS and a transmission provided for this mobile station MS in the downstream direction is short.

According to Table 3, the signaling in the downstream direction was fashioned such that every mobile station 1 through 4 was assigned an individual time slot A for signaling in which the timing advance TA is transmitted with an additional error protection. All the fewer such time slots A for signaling are required the fewer mobile stations use the common channel GPRS-K and all the more time slots I are available for neighboring cell measurements, for additional signaling (for example, connection cleardown, frequency change) or for an additional data transmission.

The exemplary embodiments can be modified to the effect that abbreviated identifier id are employed such that the abbreviated identifier ids 1 or, respectively, 3 is used with priority. In this case, delay times close to the best case of 240 ms derive. Even given a double employment of abbreviated identifier id, the spacing between the arrival of new values is diminished. When the number of abbreviated identifiers is limited further, then the delay time is also shortened. When values that have not been updated are acceptable for longer times, then the number of abbreviated identifiers id also can be incremented in steps of four to 8, 12, 16, etc.

The assigning of the abbreviated identifiers id is, in particular, adapted to the transmission conditions; i.e., to the previously registered modifications of timing advance TA and transmission power changes. How many mobile stations MS wish to use to the packet data transmission via the GPRS channel GPRS-K is also taken into consideration.

Due to the fixed allocation of time slots A for signaling in the upstream direction, the base station BS is always informed about the current transmission conditions of the radio interface and can undertake a corresponding configuration of the radio interface. A closed control circuit exists for mobile stations MS that signal in this way in upstream direction and to which the values for the timing advance TA and for the transmission power setting PC are communicated in the downstream direction via the signaling blocks GACCH. The control circuit is also possible when the mobile station MS does not transmit or receive any packet data at the moment.

When, however, packet data blocks TCH in the upstream or downstream directions are also allocated to the mobile station MS, values for the timing advance TA or the reception level pb, additionally can be calculated therefor and can be transmitted.

In particular, the packet-oriented transmission of the information via the radio interface is suited for telematic applications, fax and data file transmission, point of sales realizations, fleet management and traffic routing systems.

Indeed, although the present invention has been described with reference to specific embodiments, those of skill in the art will recognize that changes may be made thereto without departing from the spirit and scope of the invention as set forth in the hereafter appended claims.

We claim:

1. A method for configuring a radio interface between a mobile station and a base station of a time-division multiplex radio system for a packet data transmission, the method comprising the steps of:

defining a transmission from a mobile station to the base stations as an upstream direction;

defining a transmission from the base station to a mobile station as a downstream direction;

forming a channel by at least one time slot per time-division multiplex frame;

effecting the packet data transmission of a plurality of mobile stations via the channel wherein each of the plurality of mobile stations is referenced with an identifier;

providing a time slot for signaling in the channel at cyclical intervals;

identifying the plurality of mobile stations with abbreviated identifiers for the packet data transmission that are unambiguous in the channel;

assigning exclusively, by the base station, at least one time slot for signaling for the upstream direction in a cycle with all time slots for signaling to the mobile station according to a prescribable sequence; and allocating exclusively at least one time slot for signaling for the upstream direction by indicator messages that contain the abbreviated identifiers and time slot designations, wherein the allocation is independent of the packet data transmission from or to the mobile station.

2. A method for configuring a radio interface between a mobile station and a base station as claimed in claim 1, further comprising the step of:

allocating one or more abbreviated identifiers to a mobile station according to transmission conditions.

3. A method for configuring a radio interface between a mobile station and a base station as claimed in claim 1, further comprising the step of:

setting the plurality of abbreviated identifiers for a channel according to transmission conditions.

4. A method for configuring a radio interface between a mobile station and a base station as claimed in claim 1, further comprising the step of:

limiting the plurality of abbreviated identifiers for a channel to less than or equal to 4.

5. A method for configuring a radio interface between a mobile station and a base station as claimed in claim 1, further comprising the step of:

combining a plurality of time slots for signaling to form a signaling block.

6. A method for configuring a radio interface between a mobile station and a base station as claimed in claim 5, further comprising the step of:

combining the time slots for signaling according to a prescribable sequence, wherein remaining time slots are provided for a neighboring cell measurement of the mobile stations.

7. A method for configuring a radio interface between a mobile station and a base station as claimed in claim 1, further comprising the step of:

providing information in time slots for signaling with an additional encoding.

8. A method for configuring a radio interface between a mobile station and a base station as claimed in claim 1, wherein the packet data transmission in the upstream direction occurs independently of the packet data transmission in the downstream direction.

9. A method for configuring a radio interface between a mobile station and a base station as claimed in claim 1, wherein the configuration of the radio interface occurs by the base station without control by a base station controller.

10. A base station system for configuring a radio interface between a mobile station and a base station of a time-division mobile radio telephone system for packet data transmission, comprising:

a base station;

a plurality of mobile stations, wherein a transmission from a mobile station to the base station is defined as an upstream direction and a transmission from the base station to a mobile station is defined as a downstream direction;

a channel formed by at least one time slot per time-division multiplex frame, wherein the packet data transmission of the plurality of mobile stations occurs via the channel and each of the plurality of mobile stations is referenced with an identifier;

a time slot for signaling provided in the channel at cyclical intervals; and a control means for the allocation of time slots to the plurality of mobile stations, wherein the plurality of mobile stations are identified with abbreviated identifiers for the packet data transmission that are unambiguous in the channel, wherein one or more time slots for signaling for the upstream direction in a cycle with all time slots for signaling are exclusively assigned by the base station to the mobile stations according to a prescribable sequence, wherein the exclusive allocation of one or more time slots for signaling for the upstream direction occurs by indicator messages that contain abbreviated identifiers and time slot designations, and wherein the allocation is independent of the packet data transmission from or to the mobile station.

* * * * *